(12) United States Patent
Lindholm et al.

(10) Patent No.: US 8,223,158 B1
(45) Date of Patent: Jul. 17, 2012

(54) METHOD AND SYSTEM FOR CONNECTING MULTIPLE SHADERS

(75) Inventors: John Erik Lindholm, Saratoga, CA (US); Michael C. Shebanow, Saratoga, CA (US); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1272 days.

(21) Appl. No.: 11/613,018

(22) Filed: Dec. 19, 2006

(51) Int. Cl.
*G06T 1/20* (2006.01)
(52) U.S. Cl. ...................................... 345/506
(58) Field of Classification Search .................. 345/506
See application file for complete search history.

(56) References Cited

U.S. PATENT DOCUMENTS

| | | | |
|---|---|---|---|
| 2003/0179203 A1* | 9/2003 | Bruderlin et al. | 345/473 |
| 2005/0237333 A1* | 10/2005 | Tomikawa et al. | 345/572 |
| 2006/0038811 A1* | 2/2006 | Owens et al. | 345/418 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

* cited by examiner

*Primary Examiner* — Jeffery A Brier
(74) *Attorney, Agent, or Firm* — Patterson & Sheridan, LLP (57) ABSTRACT

A method and system for connecting multiple shaders are disclosed. Specifically, one embodiment of the present invention sets forth a method, which includes the steps of configuring a set of shaders in a user-defined sequence within a modular pipeline (MPipe), allocating resources to execute the programming instructions of each of the set of shaders in the user-defined sequence to operate on the data unit, and directing the output of the MPipe to an external sink.

33 Claims, 6 Drawing Sheets

METHOD AND SYSTEM FOR CONNECTING MULTIPLE SHADERS

BACKGROUND OF THE INVENTION

1. Field of the Invention

The present invention generally relates to computer graphics and more particularly to a method and system for connecting multiple shaders.

2. Description of the Related Art

Unless otherwise indicated herein, the approaches described in this section are not prior art to the claims in this application and are not admitted to be prior art by inclusion in this section.

Over the past decade, graphics hardware has gone from a simple memory device to a configurable device and relatively recently, to a programmable graphics processing unit (GPU). To fully realize the parallel processing capabilities of a GPU, as much GPU functionality as possible needs to be programmable and be exposed to developers. Among other things, doing so enables developers to tailor their shader programs to optimize the way a GPU processes graphics scenes and images. In a prior art approach, a GPU includes a series of processing units, each is configured to carry out a different and often dedicated function of a graphics pipeline, where the output of one processing unit is the input to the next processing unit in the chain. Some of these processing units in the graphics pipeline are programmable, such as a vertex processing unit and a fragment processing unit, but other processing units perform fixed functions, such as a primitive assembler, a geometry processor, and a rasterizer.

The aforementioned prior art approach has some shortcomings. First, without full programmability, the aforementioned graphics pipeline is unable to efficiently respond to changes in Application Programming Interface (API), such as OpenGL and DirectX, or address any bugs identified to be associated with the pipeline. Second, because many functions of the graphics pipeline and the sequence of performing such functions are fixed, a graphics application utilizing the graphics pipeline does not have the full flexibility to maneuver various shader programs, such as invoking shader programs in a different sequence than the sequence of the pipeline stages (e.g., invoking a geometry shader ahead of a vertex shader) or repeating a particular shader program multiple times (e.g., invoking a vertex shader six times). Even with workaround approaches capable of emulating the maneuvering of various shader programs on the prior art system, these approaches are cumbersome to implement and are inefficient to operate. For example, one workaround approach is to configure a graphics pipeline to execute a particular shader program, stream the output of the shader program into a frame buffer, reconfigure the graphics pipeline to execute another shader program, re-inject the stored data from the frame buffer back to the reconfigured pipeline for processing, and repeat these steps until all the shader programs are processed in a specific sequence. The repeated configurations of the graphics pipeline and the accesses of the frame buffer likely consume significant processing and memory resources and introduce undesirable delays. Another workaround approach involves merging the multiple shader programs and recompiling the merged program to generate a single all-encompassing shader program for the graphics pipeline to process. This approach is inefficient, because if any of the shader programs or the sequence of executing the shader programs needs to be altered, then these extra steps of merging and compiling also need to be repeated.

Lastly, the prior art approach does not support a mechanism that reconciles different input and output requirements of multiple shader programs. To illustrate, suppose a first shader program to be operated on a prior art GPU requests for 40 outputs but a second shader program, coupled to the first shader program, only requests for 6 inputs. In other words, the second shader program is designed to read only 6 of the 40 outputs from the first shader program. Without considering the requirements of the second shader program, the GPU still allocates the resources for all 40 outputs for the first shader program.

As the foregoing illustrates, what is needed in the art is a method and system for supporting a user-configurable graphics pipeline capable of efficiently executing various shader programs.

SUMMARY OF THE INVENTION

A method and system for connecting multiple shaders are disclosed. Specifically, one embodiment of the present invention sets forth a method, which includes the steps of configuring a set of shaders in a user-defined sequence within a modular pipeline (MPipe), allocating resources to execute the programming instructions of each of the set of shaders in the user-defined sequence to operate on the data unit, and directing the output of the MPipe to an external sink.

At least one advantage of the invention disclosed herein is the flexibility and the programmability of configuring a set of shaders in any user-defined sequence, so that at least the problems described above are addressed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, unless indicated otherwise, the terms "shader" and "shader program" are used interchangeably and broadly refer to a program that performs the processing for one or more graphics pipeline stages within a GPU. Generally, many different shaders in many different configurations are used to render an image.

Figure 1:
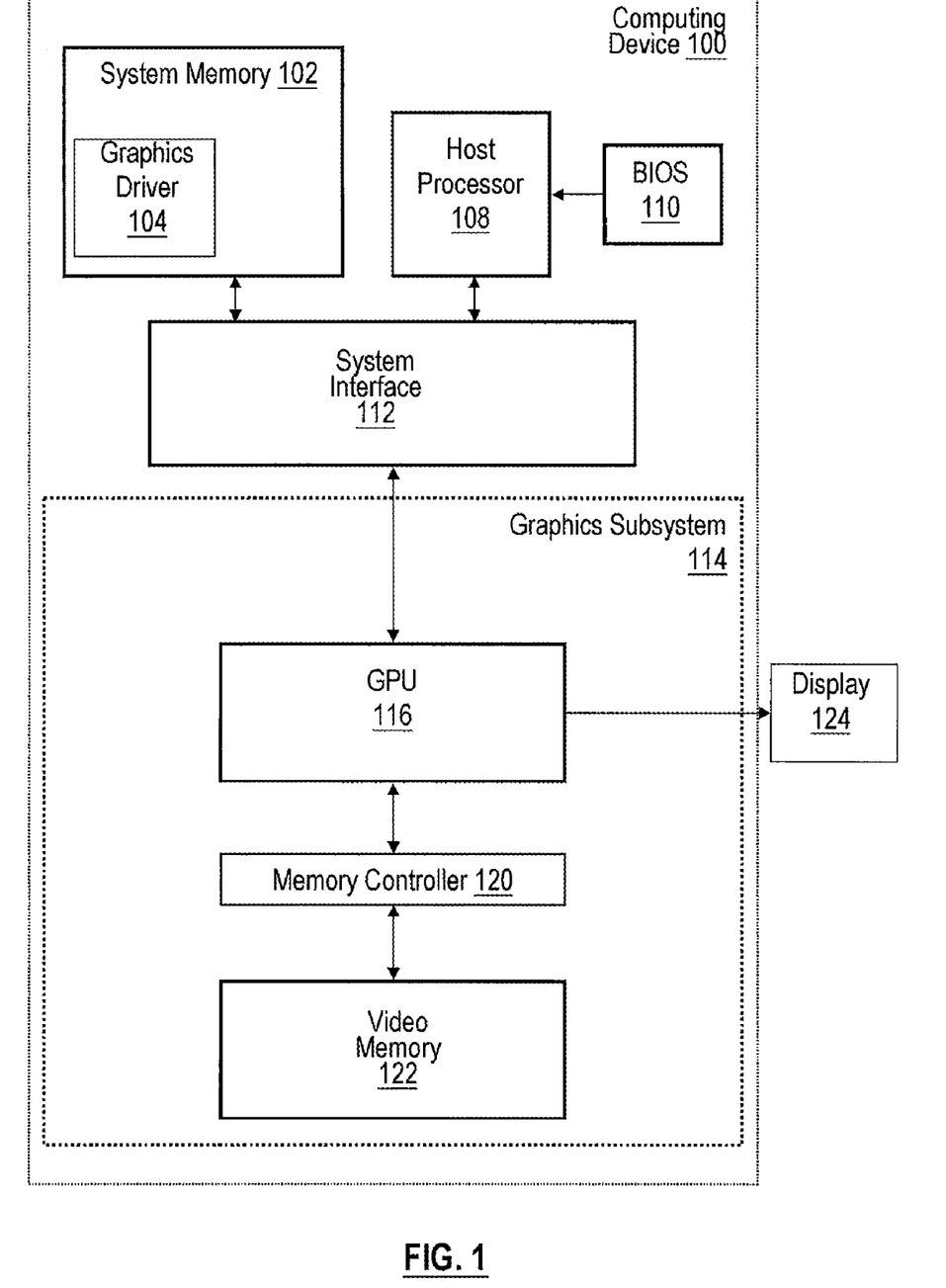
FIG. 1 is a simplified block diagram of a computing device configured to implement one or more aspects of the invention.

FIG. 1 is a simplified block diagram of a computing device 100 configured to implement one or more aspects of the invention. Without limitation, computing device 100 may be a desktop computer, server, laptop computer, palm-sized computer, tablet computer, game console, cellular telephone, hand-held device, mobile device, computer based simulator, or the like. Computing device 100 includes a host processor 108, BIOS 110, system memory 102, and a system interface 112 that is directly coupled to a graphics subsystem 114. BIOS 110 is a program stored in read only memory ("ROM") or flash memory that is run at bootup. Graphics subsystem 114 includes a GPU 116.

Host processor 108 executes programming instructions stored in system memory 102 to operate on data also stored in system memory 102. System interface 112 bridges communication between host processor 108 and GPU 116. In alternate embodiments, host processor 108, GPU 116, system interface 112, or any combination thereof, may be integrated into a single processing unit. Further, the functionality of GPU 116 may be included in a chipset or in some other type of special purpose processing unit or co-processor. GPU 116 receives instructions transmitted by host processor 108 and executes the instructions to render graphics data and images stored in video memory 122. GPU 116 causes certain graphics images stored in video memory 122 to be scanned out to a display 124. GPU 116 accesses video memory 122 via a memory controller 120.

System memory 102 further includes an application program, one or more shader programs, an API, and graphics driver 104. The application program generates calls to the API in order to produce a desired set of results, typically in the form of a sequence of graphics images. The application program also invokes the shader programs with programming instructions that are designed to be executed by one or more streaming multiprocessors (SM) within GPU 116. Graphics driver 104 transmits the programming instructions of the shader programs to GPU 116.

Display 124 is an output device capable of emitting a visual image corresponding to an input data signal. For example, the display may be built using a cathode ray tube (CRT) monitor, a liquid crystal display, or any other suitable display system.

Figure 2:
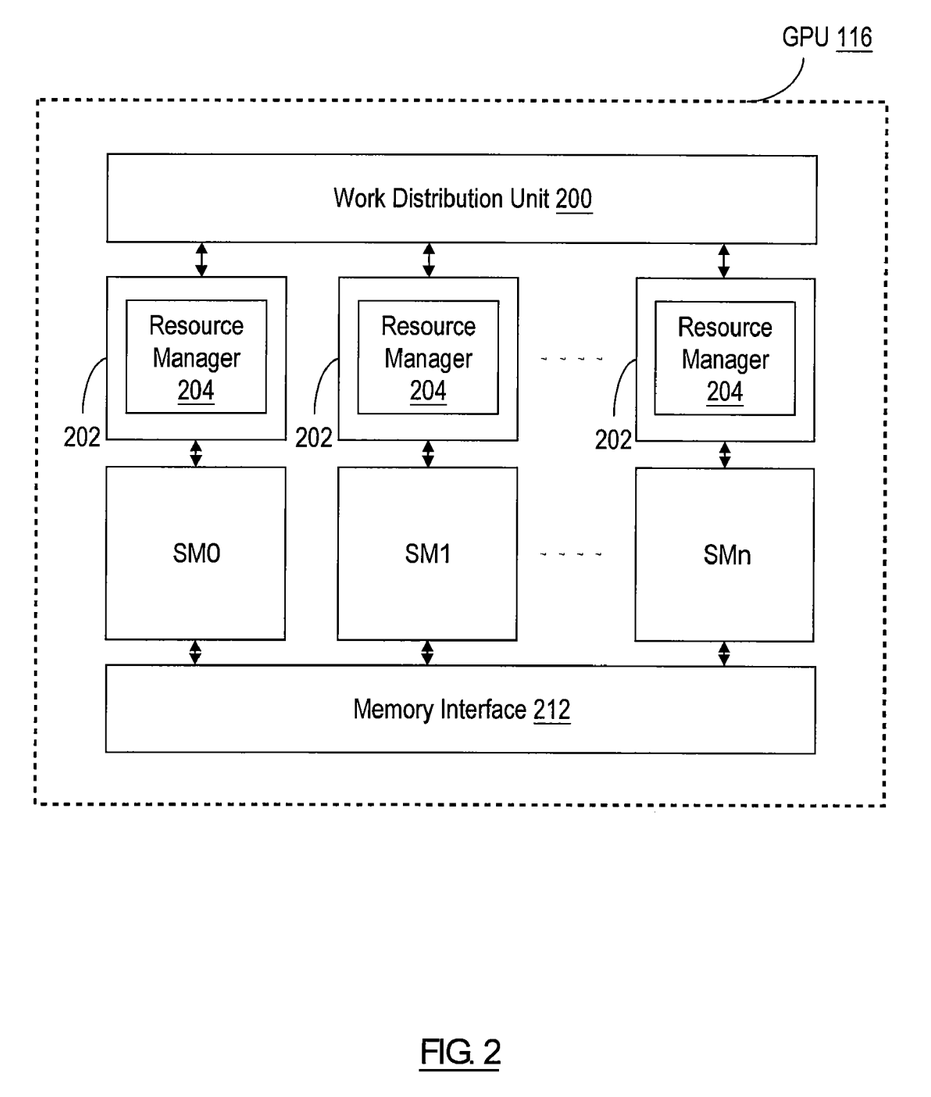
FIG. 2 is a simplified block diagram of a graphics processing unit, according to one embodiment of the invention.

FIG. 2 is a simplified block diagram of GPU 116, according to one embodiment of the invention. GPU 116 includes a number n of SMs. Each SM is capable of executing multiple program threads concurrently. Using one embodiment of a multithreaded SM0 as an illustration, SM0 receive processing tasks for execution via a work distribution unit 200, which receives commands defining these processing tasks from graphics driver 104 shown in FIG. 1. SM0 also communicates with memory interface 212 to read from or write to various memory devices. In one implementation, memory interface 212 includes an interface adapted to communicate with video memory 122 via memory controller 120 as shown in FIG. 1, as well as a connection to system interface 112 to enable SM0 to communicate with system memory 102 or other memory that is not local to GPU 116.

SM0 is further coupled to a modular pipe (MPipe) controller 202, which includes a resource manager 204. As will be described in further details in subsequent paragraphs, MPipe controller 202 is responsible for setting up and triggering one or more instances of an MPipe to be executed on SM0. An MPipe here broadly refers to a configurable construct enabling one or more shader programs to be executed in any user-defined sequence. In another implementation, a software graphics pipe, instead of SM0, executes one or more instances of an MPipe and allows distribution of packets among these MPipes. With the graphics pipe implemented as a software controlled program, configuring the graphics pipe in any arbitrary sequence becomes possible. SM1 is further coupled to a MPipe controller 206, which includes a resource manager 208. SMn is further coupled to a MPipe controller 214, which includes a resource manager 210. MPipe controllers 206, 214 are similar to Mpipe controller 202.

Figure 3A:
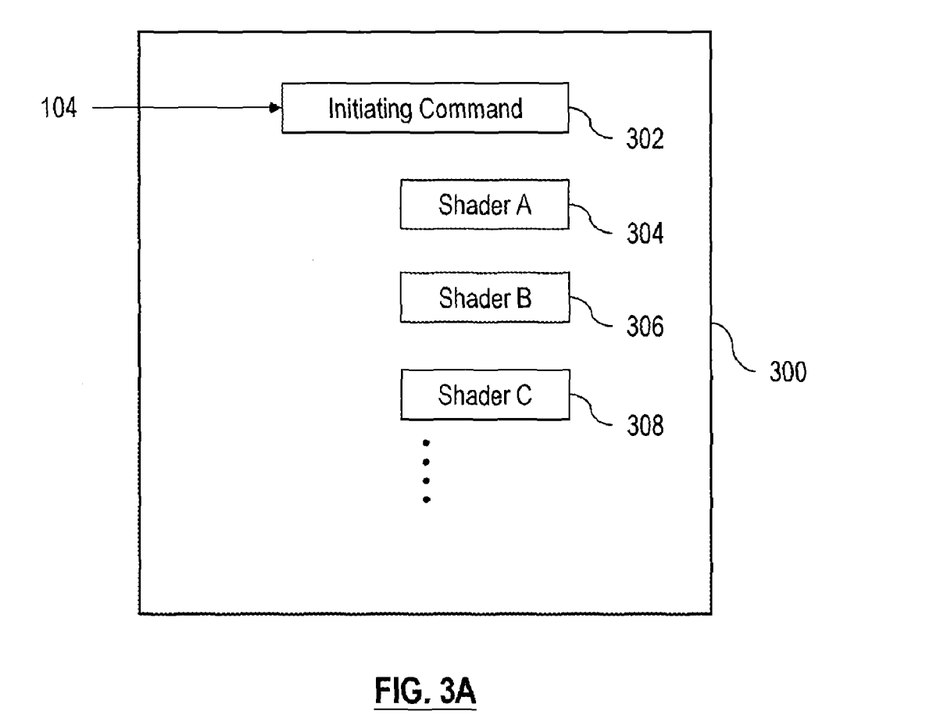
FIG. 3A is a conceptual diagram of a generic MPipe, according to one embodiment of the invention.

FIG. 3A is a conceptual diagram of a generic MPipe 300, according to one embodiment of the invention. Generic MPipe 300 includes a set of shaders, such as shader A 304, shader B 306, and shader C 308. An initiating command 302 from graphics driver 104 triggers the creation of an instance of the MPipe. After all the shaders in the MPipe are executed, the instance of the MPipe is terminated. If termination of the instance is desired before the execution of all the shaders, then graphics driver 104 in one implementation issues a kill command to stop further execution of input work packets. Continuing with the example mentioned above, suppose generic MPipe 300 executes on SM0. Upon receiving initiating command 302, MPipe controller 202 of FIG. 2 creates an instance of generic MPipe 300 with the shaders configured in the user-defined sequence shown in FIG. 3. SM0 executes these shaders serially to operate on a set of input data. The shaders can form a linear processing list, where shader A 304 may receive input in the form of vertices, the output from shader A 304 forms the input to shader B 306, and the output from shader B 306 forms the input to shader C 308. In an alternative configuration, the output from shader A 304 forms the input for both shader B 306 and shader C 308 in a tree-like arrangement. It should be noted that the connectivity among the shaders is configurable, and the configuration for generic MPipe 300 can be any type of directed graph. Also, generic MPipe 300 also supports replicating any shader within the MPipe. For instance, although vertex processing occurs prior to geometry processing in a traditional graphics pipeline, generic MPipe 300 may be configured to have a vertex shader after a geometry shader. Also, instead of performing vertex processing once in a single pass through the traditional graphics pipeline, generic MPipe 300 may be configured to have multiple vertex shaders successively. In addition, each of the shaders can be of a different type. For example, in one implementation, shader A 304 is a vertex shader, shader B 306 is a tessellation shader, and shader C 308 is a geometry shader. Such an MPipe is referred to as a geometry MPipe. In another implementation, however, all the shaders in generic MPipe 300 are of the same type, such as vertex shaders.

Figure 3B:
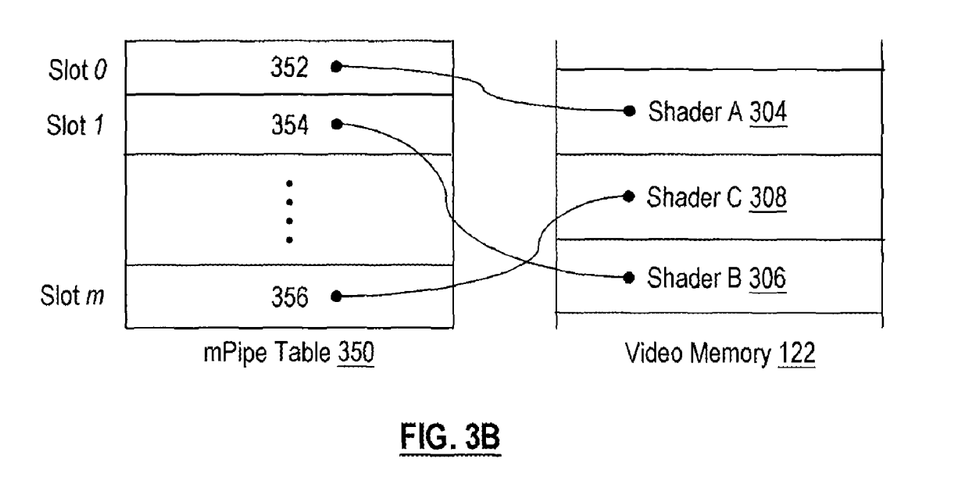
FIG. 3B is a simplified diagram of an MPipe table, according to one embodiment of the invention.

To identify the various shaders that are loaded in a memory system, one embodiment of generic MPipe 300 utilizes an MPipe table. It should be apparent to a person with ordinary skills in the art to recognize that this memory system can be any memory system that is accessible by GPU 116 shown in FIG. 1. However, for illustration purposes, the following discussions assume the shaders are loaded in video memory 122. FIG. 3B is a simplified diagram of an MPipe table 350, according to one embodiment of the invention. MPipe table 350 includes a number m of slots, each containing a pointer pointing to a block of memory locations in video memory 122 that store the programming instructions of a shader in generic MPipe 300. In particular, slot 0 of MPipe table 350 contains a pointer 352, which points to shader A 304 in video memory 122. Similarly, slot/and slot m contain pointers 354 and 356, which point to shader B 306 and shader C 308, respectively. As shown, MPipe table 350 is not required to use contiguous slots to store the pointers. So, instead of storing pointer 356 in slot 2, pointer 356 is stored in slot m (suppose m>2 in this example). In one implementation, each slot of MPipe table 350 is associated with an enable bit. If the enable bit for a slot, such as slot 0, is set to 1, then the content of slot 0 is retrieved, meaning the configuration for slot 0 and the program for slot 0 are read from memory and the MPipe stage is put into a state where work packets can be received and processed. On the other hand, if the enable bit for a slot, such as slot 2, is set to 0, then slot 2 is skipped.

Figure 4:
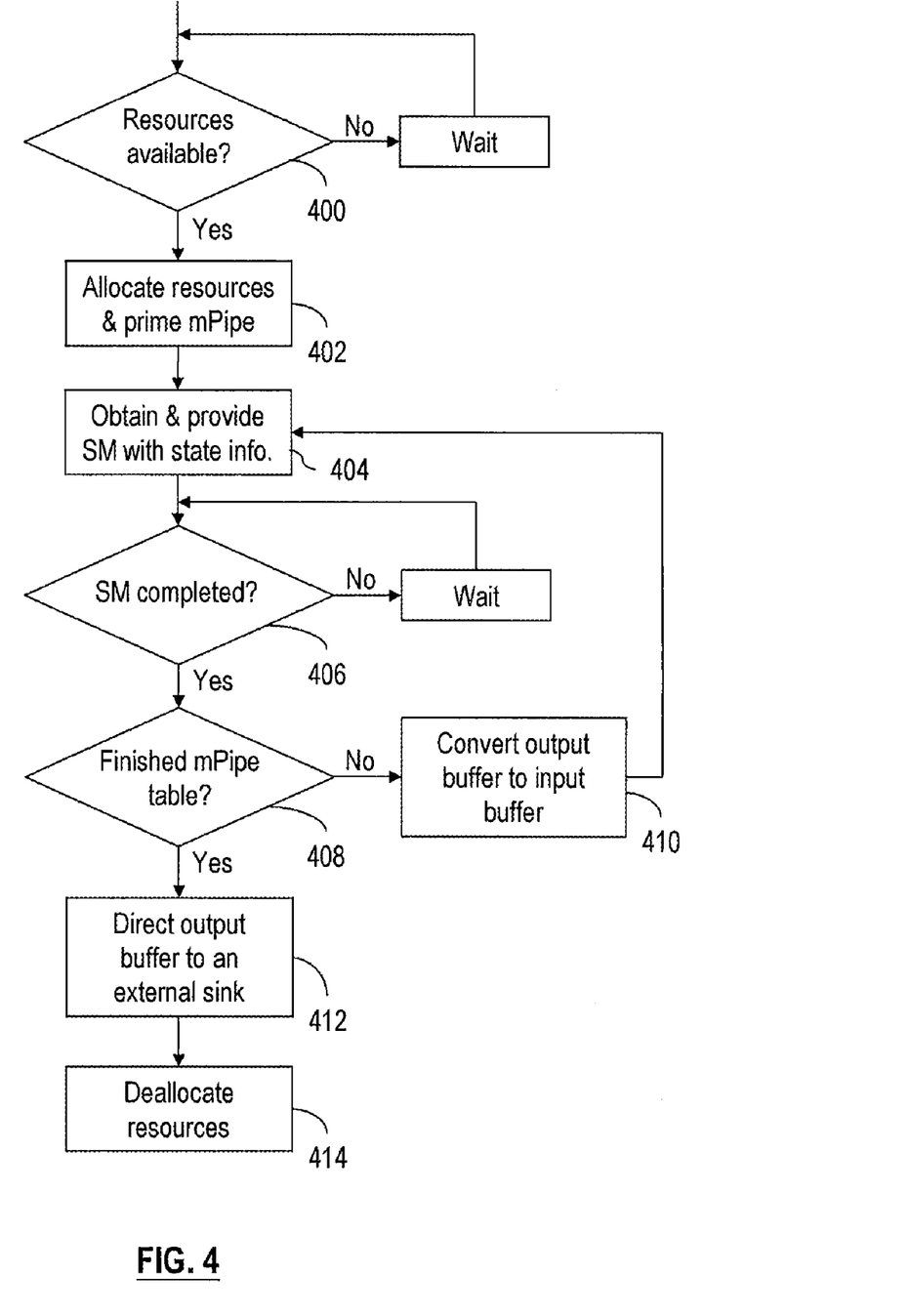
FIG. 4 illustrates a flowchart of method steps for one instance of a generic MPipe to process an incoming packet of work, according to one embodiment of the invention.

Based on commands from a graphics application, graphics driver 104 shown in FIG. 1 configures MPipe table 350 with appropriate pointers pointing to the memory locations containing the shaders that the graphics application intends to execute. With the configured MPipe table 350 and the shaders already loaded in memory, MPipe controller 202 waits for an external event to trigger the operations of generic MPipe 300. One external event is the arrival of a packet of work at the head of generic MPipe 300. This external event along with the traversal of the packet through generic MPipe 300 defines an instance of the MPipe. Each SM is capable of executing multiple instances of an MPipe concurrently to operate on multiple streams of work. FIG. 4 illustrates a flowchart of method steps for one instance of generic MPipe 300 to process an incoming packet of work, according to one embodiment of the invention. For discussion purposes, suppose SM0 of FIG. 2 executes this instance of the MPipe, MPipe controller 202 manages MPipe table 350, and resource manager 204 of MPipe controller 202 manages certain resources of SM0. In step 400, resource manager 204 checks whether there are available resources of SM0 to execute a new instance of generic MPipe 300. If not, MPipe controller 202 waits for the resources to free up. Otherwise, in step 402, one implementation of resource manager 204 allocates the necessary resources up front to execute this instance of generic MPipe 300, and MPipe controller 202 "primes" this generic MPipe 300 by loading the packet of work in an input buffer to the first shader of generic MPipe 300, shader A 304. In another implementation, instead of MPipe controller 202 managing all the data movement among the input and output buffers of the shaders, a primitive engine within GPU 116 (not shown in FIG. 2) actually moves data from external sources into the input buffer to the first shader, and a buffer management unit also within GPU 116 (not shown in FIG. 2) copies data from an input buffer to an output buffer. Also, it is worth noting that improper resource allocation here may cause deadlock. In step 404, MPipe controller 202 obtains and provides certain state information to SM0. In one implementation, MPipe controller 202 obtains a slot number for MPipe table 350 from the packet of work. Suppose the obtained slot number is slot 0. Then, MPipe controller 202 looks up slot 0, identifies pointer 352, and provides pointer 352 to SM0. In addition to pointer 352, MPipe controller 202 also obtains and provides the pointers to the input buffer and the output buffer of shader A 304 to SM0. All three aforementioned types of pointers are some examples of the state information discussed in step 404.

With these pointers, SM0 loads the programming instructions for shader A 304 from video memory 122 shown in FIG. 3B, executes shader A 304 to operate on the data stored in the input buffer of shader A 304, and generates and places output data in the output buffer of shader A 304. If SM0 completes the aforementioned tasks in step 406, then in step 408, MPipe controller 202 verifies whether all the slots of MPipe table 350 have been processed. If not, that means more shaders in generic MPipe 300 still need to be executed, and MPipe controller 202 converts the output buffer of the current shader into the input buffer of the shader immediately following the current shader in step 410. In this example, the output buffer of shader A 304 becomes the input buffer of shader B 306. Then the process of feeding SM0 with relevant state information to execute a shader continues until all the slots of MPipe table 350 are processed. When MPipe controller 202 finishes processing MPipe table 350, MPipe controller 202 in step 412 directs the last output buffer to an external sink, such as a distribution point to another SM executing a particular MPipe or to a fixed function unit (e.g., a setup/raster unit). More specifically, multiple MPipes can be chained together, where each of the MPipes may be executed by a different SM. In a graphics pipeline, multiple MPipes can be defined at any point in time. For example, the graphics pipeline can include a geometry MPipe, setup/raster unit, and a pixel MPipe. Lastly, resource manager 202 deallocates resources of SM0 in step 414. It should be noted that an MPipe is not required to output a single output packet.

As discussed above, each of the n number of SMs in GPU 116 is capable of executing multiple instances of an MPipe concurrently. One approach for GPU 116 to execute n different types of MPipes is to assign a mask to each SM. In particular, the mask may enable the SM to process one type but disable it to process any other types of an MPipe. As a result, using this mask potentially limits each of n SMs to execute a distinct type of an MPipe.

Figure 5:
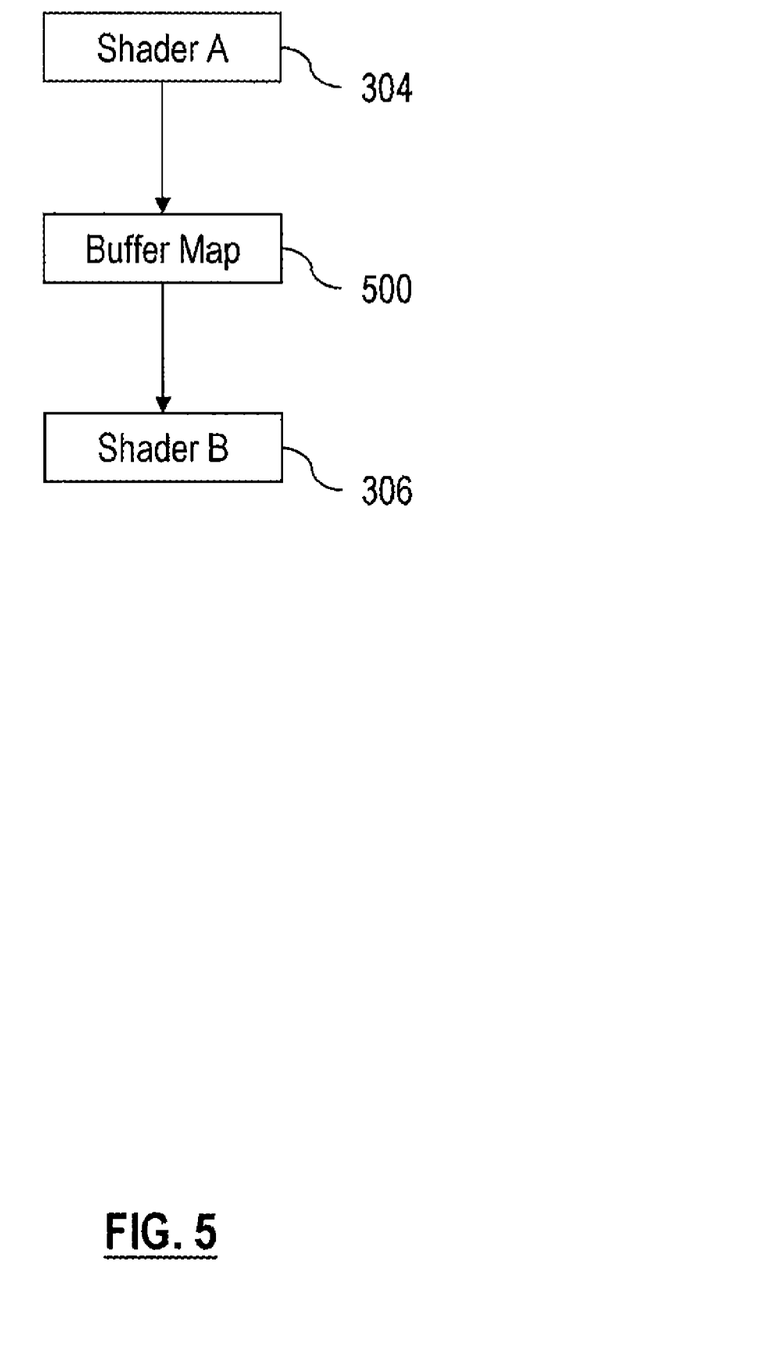
FIG. 5 is a conceptual diagram of a buffer map in between two shaders, according to one embodiment of the invention.

To ensure resources are efficiently utilized to execute the various shaders in generic MPipe 300, one approach is to match the expected output of a first shader at a current stage and the expected input of a second shader at an immediately subsequent stage. Specifically, a shader typically has a shader header, which is generated by a compiler along with executable program instructions and includes an input map and an output map. The input map describes the input that the shader expects to receive, and the output map describes the output that the shader expects to generate. An overlap between the output map of the first shader and the input map of the second shader is referred to as a "buffer map." FIG. 5 is a conceptual diagram of a buffer map 500 in between shader A 304 and shader B 306, according to one embodiment of the invention. Continuing with the example of SM0 executing generic MPipe 300, SM0 uses buffer map 500 to determine the appropriate resources to allocate at the output of shader A 304 and at the input of shader B 306. To illustrate, suppose in the first scenario, the output map of shader A 304 contains attributes of a, b, and c, and the input map of shader B 306 contains attributes of b and c., where a, b, and c can be scalars, vectors, or some other resource. Whenever shader A 304 generates an output including the attribute of a, SM0 recognizes that a is not in buffer map 500 and thus removes a before it reaches shader B 306. In other words, instead of allocating resources for a, b, and c, only the resources for b and c are allocated. In the second scenario, suppose the output map of shader A 304 still contains attributes of a, b, and c, but the input map of shader B 306 contains b, c, and d. Here, before shader B 306 reads its input, SM0 recognizes that d is not in buffer map 500 and thus adds a default value (e.g., {0,0,0,1} for a vector or 1.0 for a scalar) in place of d. Therefore, with buffer map 500, only the needed resources are allocated, and the remaining resources can be reserved for operating additional instances of generic MPipe 300. Both of the aforementioned scenarios assume the output from one shader (e.g., shader A 304) is used as input for also only one shader (e.g., shader B 306), and each entry in buffer map 500 is the result of performing a logical AND operation between corresponding entries in an output map and an input map (e.g., the output map of shader A 304 and the input map of shader B 306). However, if the shaders are organized as a directed graph with the output from one shader being the input to a plurality of other shaders, then each buffer map entry is formed by performing the logical AND operation between the following two items: (1) an entry in the output map of the shader generating the output; and (2) the result from performing a logical OR operation among the corresponding entries in the input maps of all the shaders using the output as their inputs. In other words, the buffer map here indicates which shader output is needed as an input to a subsequent shader.

The shader header of a shader may include any or all of the following information: (a) the type of the shader, such as, without limitation, a vertex shader, a tessellation shader, or a geometry shader; (b) the number of temporary registers needed by the shader; (c) the output primitive type, such as, a point, a line, a triangle, a line strip, a triangle strip, lines with adjacency, or triangles with adjacency; and (d) the maximum number of vertices outputted by the shader. Referring back to FIG. 3A and FIG. 3B, suppose shader A 304 includes a shader header as well as executable code. In one implementation, the shader header is of the same fixed size for all shaders in generic MPipe 300, and pointer 352 points to a program header for shader A 304 and with the executable code of shader A 304 residing a fixed offset from pointer 352. Alternatively, the shader header of Shader A 304 includes a pointer or a relative offset to the executable code of shader A 304. Yet in another implementation, MPipe table 350 shown in FIG. 3B contains separate pointers to the shader header and the executable code for the shaders. In addition, the shader header can be configured via commands and stored as part of the entries in MPipe table 350.

Figure 6:
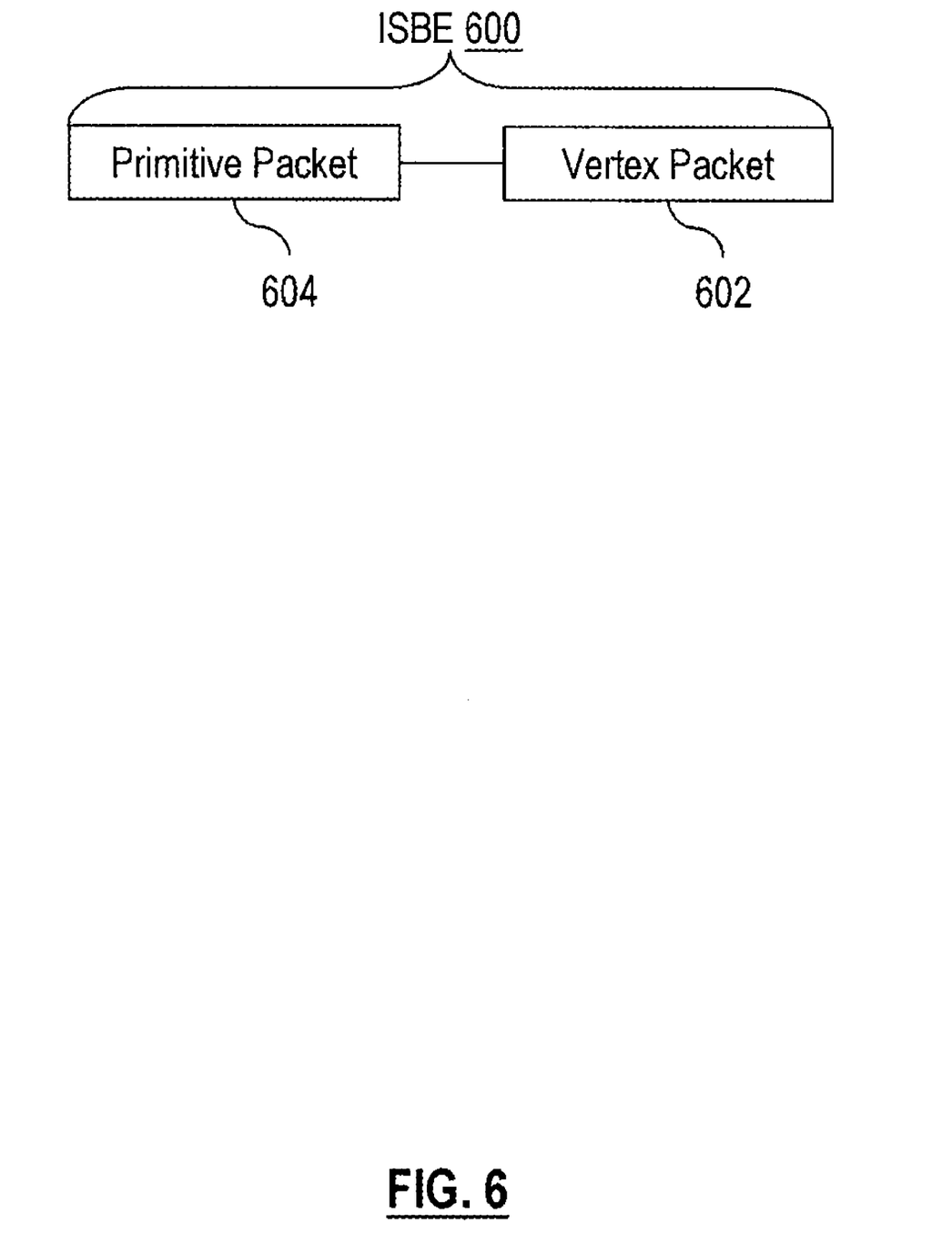
FIG. 6 is a conceptual diagram of a packet format suitable for an MPipe, according to one embodiment of the invention.

To traverse through while accommodating potentially different types of shaders in generic MPipe 300, FIG. 6 is a conceptual diagram of a packet format suitable for the MPipe, according to one embodiment of the invention. Specifically, the packet of work corresponds to an Inter Stage Buffer Element (ISBE) 600, which includes a vertex packet 602 and a primitive packet 604. Vertex packet 602 contains attribute information, such as color and position information, for multiple vertices. Primitive packet 604 contains topology information, such as indices of a primitive pointing to a set of the vertices specified in vertex packet 602. Because each shader in generic MPipe 300 defines its expected input data and output data, ISBE 600 traversing through the MPipe may change as each shader acts on it. For example, a vertex shader can modify vertex packet 602, and a geometry shader can modify both vertex packet 602 and primitive packet 604. Other types of shaders may even generate multiple output ISBE's, each of which is independent of the others.

To illustrate further, suppose shader A 304 is a vertex shader, and shader A 304 expects to operate on an input primitive of a certain type (e.g., triangle) and generates an output primitive of the same type (e.g., triangle). Here, since the topology information is expected to remain the same, shader A 304 does not modify ISBE 600. On the other hand, suppose shader B 306 is a geometry shader, and shader B 306 expects to operate on an input primitive of a first type (e.g., triangle) and generates an output primitive of a second type (e.g., point). Here, since the topology information is expected to change, if ISBE 600 flows through shader B 306, then shader B 306 modifies primitive packet 604 of ISBE 600 to reflect the topology change.

The above description illustrates various embodiments of the invention along with examples of how aspects of the invention may be implemented. The above examples, embodiments, instruction semantics, and drawings should not be deemed to be the only embodiments, and are presented to illustrate the flexibility and advantages of the invention as defined by the following claims.

We claim:

1. A method for processing a data unit in a modular execution pipeline (MPipe), the method comprising:
    configuring, by a streaming multiprocessor included within a graphics processing unit (GPU), a set of shaders in a user-defined sequence within the MPipe, wherein the MPipe is located within the GPU;
    allocating, by the streaming multiprocessor, resources for executing programming instructions associated with each shader included in the set of shaders to process the data unit;
    executing, by the streaming multiprocessor, the program instructions associated with at least one shader included in the set of shaders to generate an output of the MPipe; and
    causing the output of the MPipe to be transmitted to an external sink.

2. The method of claim 1, further comprising:
    maintaining state information associated with each of the set of shaders; and
    retrieving the programming instructions of each of the set of shaders based on the state information.

3. The method of claim 2, wherein the state information includes a pointer to a memory location containing one of the set of shaders.

4. The method of claim 3, wherein the pointer is associated with an enable bit, which causes the pointer to either be retrieved or skipped.

5. The method of claim 3, wherein the state information further includes an output buffer pointer associated with a first shader from the set of shaders and an input buffer pointer associated with a second shader from the set of shaders and immediately subsequent to the first shader.

6. The method of claim 5, further comprising:
    identifying an overlap between an expected output from the first shader and an expected input to the second shader; and
    allocating resources based on the overlap to store an actual output from the first shader and to read an actual input to the second shader.

7. The method of claim 6, further comprising removing an output element from the actual output, if the output element is missing from the overlap.

8. The method of claim 6, further comprising adding a default value to the actual input in place of an input element in the expected input, if the input element is missing from the overlap.

9. The method of claim 1, wherein the data unit further includes a vertex packet containing attribute information of a plurality of vertices and a primitive packet containing topology information associated with the plurality of vertices.

10. The method of claim 9, further comprising modifying the data unit by one of the set of shaders, if the topology information changes.

11. The method of claim 4, wherein the memory location contains a shader header and executable shader code for the one of the set of shaders.

12. The method of claim 11, wherein the shader header includes type information associated with the one of the set of shaders.

13. The method of claim 11, wherein the shader header includes a number of temporary registers associated with the one of the set of shaders.

14. The method of claim 11, wherein the shader header includes a maximum number of vertices generated by the one of the set of shaders.

15. The method of claim 11, wherein the shader header includes an output primitive type generated by the one of the set of shaders.

16. The method of claim 5, further comprising:
identifying an overlap among an expected output from the first shader, an expected input to the second shader, and an expected input to a third shader; and
allocating resources based on the overlap to store an actual output from the first shader and to read an actual input to the second shader and the third shader.

17. A computing device configured to process a data unit in a modular execution pipeline (MPipe), the computing device comprising:
a host processor;
a graphics processing unit (GPU), further including a streaming multiprocessor (SM) and a corresponding MPipe controller; and
a system memory including a graphics driver and an application program, wherein the MPipe controller is configured to:
configure a set of shaders for execution by the application program in a user-defined sequence within the MPipe;
allocate resources for the SM to execute programming instructions associated with each shader included in the set of shaders to process the data unit; and
cause the output of the MPipe to be transmitted to an external sink.

18. The computing device of claim 17, wherein:
the MPipe controller provides state information associated with each of the set of shaders to the SM; and
the SM retrieves the programming instructions of each of the set of shaders based on the state information.

19. The computing device of claim 18, wherein the state information includes a pointer to a memory location containing one of the set of shaders.

20. The computing device of claim 19, wherein the pointer is associated with an enable bit, which causes the MPipe controller to either retrieve or skip the pointer.

21. The computing device of claim 19, wherein the state information further includes an output buffer pointer associated with a first shader from the set of shaders and an input buffer pointer associated with a second shader from the set of shaders and immediately subsequent to the first shader.

22. The computing device of claim 21, wherein the MPipe controller is further configured to:
identify an overlap between an expected output from the first shader and an expected input to the second shader; and
allocate resources based on the overlap for the SM to store an actual output from the first shader and to read an actual input to the second shader.

23. The computing device of claim 22, wherein the SM removes an output element from the actual output, if the output element is missing from the overlap.

24. The computing device of claim 22, wherein the SM adds a default value to the actual input in place of an input element in the expected input, if the input element is missing from the overlap.

25. The computing device of claim 17, wherein the data unit further includes a vertex packet containing attribute information of a plurality of vertices and a primitive packet containing topology information associated with the plurality of vertices.

26. The computing device of claim 25, wherein one of the set of shaders modifies the data unit, if the topology information changes.

27. The computing device of claim 17, wherein the SM is assigned a mask enabling the SM to execute a specific type of MPipe.

28. The computing device of claim 20, wherein the memory location contains a shader header and executable shader code for the one of the set of shaders.

29. The computing device of claim 28, wherein the shader header includes type information associated with the one of the set of shaders.

30. The computing device of claim 28, wherein the shader header includes a number of temporary registers associated with the one of the set of shaders.

31. The method of claim 28, wherein the shader header includes a maximum number of vertices generated by the one of the set of shaders.

32. The method of claim 28, wherein the shader header includes an output primitive type generated by the one of the set of shaders.

33. The computing device of claim 21, wherein the MPipe controller is further configured to:
identify an overlap among an expected output from the first shader, an expected input to the second shader, and an expected input to a third shader; and
allocate resources based on the overlap for the SM to store an actual output from the first shader and to read an actual input to the second shader and the third shader.

* * * * *